United States Patent [19]

Seymour

[11] 4,140,804
[45] Feb. 20, 1979

[54] PROCESS FOR CAKE WITH INTERNALLY ENTRAINED COMPOSITE ICING

[76] Inventor: Joseph J. Seymour, 3105 California, Baltimore, Md. 21234

[21] Appl. No.: 809,082

[22] Filed: Jun. 23, 1977

Related U.S. Application Data

[63] Continuation-in-part of Ser. No. 686,296, May 14, 1976, abandoned.

[51] Int. Cl.² .......................... A21D 13/08; A23G 3/00
[52] U.S. Cl. ....................................... 426/94; 426/551; 426/552; 426/553; 426/659; 426/660
[58] Field of Search .................. 426/551, 572, 653, 94, 426/659, 553, 552

[56] References Cited

PUBLICATIONS

The Progressive Farmer Southern Country Cookbook Progressive Farmer Books, Birmingham, Ala., 1972, pp. 237–239, 242.

*Primary Examiner*—Jeanette M. Hunter
*Attorney, Agent, or Firm*—Walter G. Finch

[57] ABSTRACT

A process for making a cake and icing having a highly porous structure having an icing coated on and entrained throughout the porous structure by combining an effervescent beverage cola into a flour based batter, baking, adding additional holes to the hot baked cake and subsequently adding an effervescent cola based icing to the hot cake thereby causing the effervescing icing to penetrate the interior pores of the cake as well as providing a coating thereon.

3 Claims, No Drawings

PROCESS FOR CAKE WITH INTERNALLY ENTRAINED COMPOSITE ICING

This application is a continuation-in-part of U.S. Patent Application Ser. No. 686,296, filed by the Applicant on May 14, 1976 for Cola Cake and Icing, now abandoned.

SUMMARY OF THE INVENTION

The invention relates generally to foods and more particularly to a process for the composition of matter and formulation or recipe for penetration of an edible article and an edible coating therefor by the process. The present composition of matter particularly comprises a cola-based liquid such as is available commercially as a liquid beverage, cocoa, and marshmallows combined into a flour-based batter.

Accordingly, it is an object of the invention to provide an article of pastry comprised of a cola-based liquid beverage.

It is another object of the invention to provide a recipe and process that creates an internal foaming coaction of ingredients in the cake portion.

It is still another object of the invention to provide a process to create a special highly porous-like texture in the cake portion unlike ordinary cake textures.

It is a further object of the invention to provide a method and process for constructing the cake portion so that it facilitates the introduction of the icing into the interior of the cake portion.

It is also an object of the invention to provide a recipe process for the icing that will glaze on the outside of the cake portion, yet remain moist and candy-like when introduced into the interior of the cake portion.

It is yet another object of the invention to provide a recipe process for the invention that creates a special foaming action in the icing ingredients to force penetration of the icing into the texture voids of the cake portion.

Further objects and advantages of the invention will become more readily apparent in light of the following detailed description of the preferred embodiments.

DESCRIPTION OF THE PREFERRED EMBODIMENTS

The invention particularly comprises a new composition of matter by a specified process, which when subjected to heat over a predetermined period of time, produces a cake-like product of unexpected taste and nature. The present composition of matter, formulation, or "recipe" combines ingredients which separately have been consumed in a variety of known combinations. However, the combination of certain of these ingredients together in a single formulation by the invented process and for the production of an edible pastry article could not have been foreseen by one of ordinary skill in the culinary arts due both to the highly unusual and unexpected nature of the process and combination itself and to the unexpected nature of the finished article.

An edible pastry or cake-like article with candy-like aspects is produced from the combination of ingredients set forth below in the general proportions indicated, when prepared by the special process of this invention:

2 cups sifted all-purpose flour
2 cups sugar
1 cup cola
2 tablespoons cocoa
1 cup margarine or butter
1½ cups marshmallow
½ cup buttermilk
1 teaspoon baking soda
2 eggs (unbeaten)
1 Teaspoon vanilla.

This formulation can be combined sequentially in a preferred fashion by placing the flour and sugar in a suitable sized bowl. In a separate sauce pan, the cola, cocoa, butter (or margarine) and marshmallaow is brought to a point of boil. Note that it is "brought to a point of boil" not "boiled". The flour and sugar are then added to the heated mixture formed as indicated. The milk, baking soda, eggs, and vanilla are then stirred into the mixture and the resulting mixture is removed from contact with heat and is blended, such as in a mixer, for 2 to 3 minutes.

The preparation of the hereinbefore mentioned ingredients in the manner stated produces certain results by design of the process. The partial mixture containing the cola is brought to a boil, but as noted it is not "boiled", merely brought to the point of "boil". The designed purpose is to initiate an increased or rapid internal action of the cola, wherein the effervescense of the contained carbon dioxide gas is sent into a foaming action that the other ingredients contain or hold within the combined mass as gas bubbles.

As the other ingredients are introduced sequentially, the initiated effervescense of the process continues. At the point in the process where the baking soda is introduced in the sequence, the combination of the baking soda and the remaining cola ingredient coact to produce an intense foaming action that results in a special highly porous-like texture that is not possible with ordinary leavening admixtures or the manner in which said admixtures are used. The special design of the process of the recipe in this invention of this cola-baking soda combination and the specialized procedure for inducing the foaming coaction to the correct moment is a unique method not found in ordinary recipes.

A baking pan of dimensions similar to $13'' \times 9'' \times 2''$ is greased and floured in the usual known manner and the mixture or batter formed above is poured into the pan and cooked (baked) for 30 to 40 minutes in an oven which has been pre-heated to 350° F. The baked article is then removed from the oven and left in the pan temporarily.

With a toothpick, or similar nail-like tool, punch a plurality of spaced holes into the top of the baked cake surface. The construction of these holes is very important. The holes are to be approximately one-half inch from the sides of the pan (i.e. the outer edges of the baked cake) and spaced approximately one-half inch center to center. The punctures for the holes should be gaged so as to penetrate to a depth that is at least one-half inch from the bottom of the cake, but not more than one inch from the bottom. The entire top surface of the cake is to be prepared in this manner. A different matrix of the hole locations may be used without departing from the scope or intention of this invention.

An edible coating or icing is then prepared for the baked article by bringing to the point of boil in a sauce pan the following combination of ingredients (note again the process is to just bring to the point of boil, not boiled):

½ cup of cola
½ cup margarine or butter
3 tablespoons cocoa.

It should be noted that in the formulation of ingredients, the variation of the amounts of any one ingredient or any combination of ingredients is within the general scope and intent of this invention. The stated amounts are the preferred embodiments.

It is to be noted specifically that the mixture is brought to the point of "boil", not "boiled" for this process as aforementioned for the procedure in mixing the cake portion batter. In a manner similar to that aforementioned for the cake portion batter, the process procedure is designed to initiate an increased or rapid internal action of the cola ingredient, wherein the effervescense of the contained carbon dioxide gas is sent into a foaming action that the other ingredients contain or hold within the combined mass as gas bubbles.

On attainment of the point of boil, the mixture is removed from heat and a pound of confectioners sugar is stirred into the mixture. For variety, a cup of mixed nuts may also be added to the icing mixture. The hot icing thus formed is poured or otherwise placed on the top surface of the cake-like article, preferably while the cake is still reasonably hot. The heated mixture will continue to foam or effervesce.

As the hot icing is poured or otherwise placed on the top surface of the cake, the icing will flow into the aforementioned holes that were manually constructed in the top surface of the cake. Once inside the holes, the foaming action forces the hot icing into the porous texture of the cake. This flow into the holes may be assisted by leveling the hot icing with a spatula and repeated slight pressure above the entrance to the holes to force the icing into each of the holes. The icing will harden to a glaze on the outside, but retain a moist candy-line consistency on the inside where the foaming action of the process has forced the mixture into the porous-like cavities of the cake (a composite of icing outside and inside the cake). Thus, the hot icing is entrained into the highly porous texture of the cake portion.

The cola ingredient can be any edible cola-based liquid such as is available commercially as a liquid beverage or "soft" drink of the carbonated type.

The selection and combination of ingredients, the method of preparing the ingredients, the coactions of specific ingredients brought on by the process, the construction of the holes in the cake after baking, and the manner of applying the icing, all as aforementioned, combine in a process to produce a uniquely designed cake with special unique features made possible by the process of this invention. These features are the special highly porous-like texture that is not possible with ordinary baking procedures, the construction that introduces the icing preparation into the interior porous-like texture after the cake is baked, and the icing formula or recipe and process that results in a hardened glaze on the exterior and a moist candy-like consistency on the inside where it has been entrained by the process of internal gaseous force action to penetrate the interior of the cake.

Modifications and variations of the invention are possible in light of the above teachings without departing from the teachings and scope of the invention. It is understood, therefore, that within the scope of the appended claims the invention can be practiced other than as specifically described.

What is claimed is:

1. A process for making an edible cake-like article having an exceptionally highly porous-like texture inside and having an edible coating on the outside that is entrained into a portion of said porous-like texture through manually made openings in the top surface of said cake-like article, having incorporated therein: flour, sugar, carbonated cola beverage, cocoa, butter or margarine, marshmallow, butter milk, baking soda, eggs, and vanilla; comprising
    (a) placing the flour and sugar in a first bowl and mixing them together;
    (b) placing milk, baking soda, eggs, and vanilla in a second bowl and mixing them together;
    (c) placing cola, cocoa, butter or margarine, and marshmallow in a saucepan and mixing them together;
    (d) heating the mixture from (c) in the saucepan carefully to the point of boil, but not boiled, wherein said heating initiates a rapid increased effervescence of said cola ingredient and the gaseous by-product of this rapid increased effervescence of said cola being contained within the mixture of other ingredients in the sauce pan;
    (e) adding the mixture from (a) to the heated mixture from (d) in the sauce pan and blending them together;
    (f) adding the mixture from (b) to the heated mixture from (e) and blending them together, wherein the baking soda in the mixture from (b) is mixed with the heated and rapidly effervescing cola from (d) and coacts in an instantaneous reaction and vigorously produces carbon dioxide which in turn produces a foaming action within the mixture, the carbon dioxide and the gaseous by-product from the increased effervescence of the cola being contained within the mixture of other ingredients;
    (g) removing the mixture of (f) from the heat source and;
    (h) continuing the blending of the mixture from (g) for 2 or 3 minutes;
    (i) placing the mixture from (h) in a greased and floured baking pan;
    (j) baking the mixture from (i) in a pre-heated oven at 350° F. for 30 to 40 minutes, wherein the intense foaming action set up in (f) by the mixture of the heated and effervescing cola and the baking soda coacting together, plus the gaseous by-produce from the rapid effervescing cola, maintains the internal forceful action during the baking period and results in an exceptionally highly porous-like texture inside the baked cake-like article;
    (k) manually punching a matrix of a plurality of spaced holes in the top surface of the baked cake-like article from (j) with a sharp tool, said holes being of nail-like size, spaced approximately one-half inch center to center over entire top surface of said cake-like article, said holes gaged so as to penetrate to a depth approximately one-half inch from the bottom of said cake-like article;
    (l) placing the cola, butter or margarine, and cocoa in a sauce pan and mixing them together;
    (m) heating the mixture from (l) in the sauce pan carefully to the point of boil, but not boiled, said heating initiating a rapid increased effervescence of said cola ingredient, the gaseous by-product of said cola being contained within the mixture of other ingredients;
    (n) removing the mixture in the saucepan of (m) from the heat source;

(o) adding confectioner's sugar by stirring to the heated mixture from (n) to produce a hot icing, the foaming action of the rapid effervescing cola continuing;

(p) pouring the mixture from (o) on the top surface of the baked cake-like article with the matrix of a plurality of spaced holes from (k) while said cake-like article is still hot, while the mixture from (o) continues to foam;

(q) causing the hot icing to flow into the spaced plurality of holes by leveling with suitable pressure said foaming action within said mixture from (o) produces a force within said hot icing that entrains said hot icing into the highly porous interior of the cake-like article that surrounds each of the manually made holes and (r) leveling the balance of hot icing mixture to all exterior surfaces of the cake-like article.

2. The process for making an edible cake-like article as recited in claim 1, wherein the amounts of the ingredients selected in (a) and (b) comprise:
Flour: 2 cups
Sugar: 2 cups
Cola carbonated-type beverage: 1 cup
Cocoa: 2 tablespoons
Butter (or margarine): 1 cup
Marshmallow: 1½ cups
Butter milk: ½ cup
Eggs: 2
Vanilla: 1 teaspoon 3. The process for making an edible cake-like article as recited in claim 1, wherein the amounts of the ingredients selected in (l) comprise:
Cola carbonated-type beverage: ½ cup
Butter (or margarine): ½ cup
Cocoa: 3 tablespoons
Confectioners sugar: 1 pound.

* * * * *